United States Patent [19]

May

[11] Patent Number: 4,465,046
[45] Date of Patent: Aug. 14, 1984

[54] METHOD AND APPARATUS FOR CONTROLLING THE COMBUSTION PROCESS OF AN INTERNAL COMBUSTION ENGINE

[76] Inventor: Michael G. May, CH-1180 Rolle, Bel Air, Switzerland

[21] Appl. No.: 312,481

[22] Filed: Oct. 19, 1981

[30] Foreign Application Priority Data

Oct. 17, 1980 [DE] Fed. Rep. of Germany ....... 3039338
Sep. 30, 1981 [DE] Fed. Rep. of Germany ....... 3139000

[51] Int. Cl.³ .......................... F02D 33/00; F02P 5/14
[52] U.S. Cl. .................................... 123/425; 123/435; 73/35; 73/115
[58] Field of Search ................ 123/425, 435, 146.5 A; 73/35, 115

[56] References Cited

U.S. PATENT DOCUMENTS

| | | | |
|---|---|---|---|
| 2,543,141 | 2/1951 | Vichnievsky | 73/35 |
| 4,130,097 | 12/1978 | Ford | 123/425 |
| 4,190,027 | 2/1980 | Inui et al. | 123/425 |
| 4,211,194 | 7/1980 | Hattori et al. | 123/425 |
| 4,232,545 | 11/1980 | Dobler et al. | 123/435 |
| 4,304,203 | 12/1981 | Garcea et al. | 123/425 |
| 4,377,140 | 3/1983 | Latsch | 123/425 |

FOREIGN PATENT DOCUMENTS

| | | |
|---|---|---|
| 2443413 | 3/1976 | Fed. Rep. of Germany . |
| 2930013 | 2/1980 | Fed. Rep. of Germany . |
| 378966 | 8/1932 | United Kingdom . |
| 1519005 | 7/1978 | United Kingdom . |
| 2026608 | 2/1980 | United Kingdom . |

Primary Examiner—Andrew M. Dolinar
Attorney, Agent, or Firm—Edwin E. Greigg

[57] ABSTRACT

Method and apparatus for controlling the combustion process of an internal combustion engine having at least one cylinder and an ignition device for initiating ignition of a combustible charge, whereby:

(1) the moment of ignition of the charge at a position F in the combustion chamber is sensed, the position F being spaced from the ignition device so that the flame front of the flame initiated by the ignition device can only arrive at the position F after a predominant portion of the charge has been burnt;
(2) at least the direction of a deviation of the piston moving within the cylinder from a selected piston position K is sensed at the moment of ignition at the position F; and
(3) the ignition timing and/or composition of the charge is automatically regulated in accordance with at least the sensed piston deviation to achieve approximate F-K coincidence.

14 Claims, 9 Drawing Figures

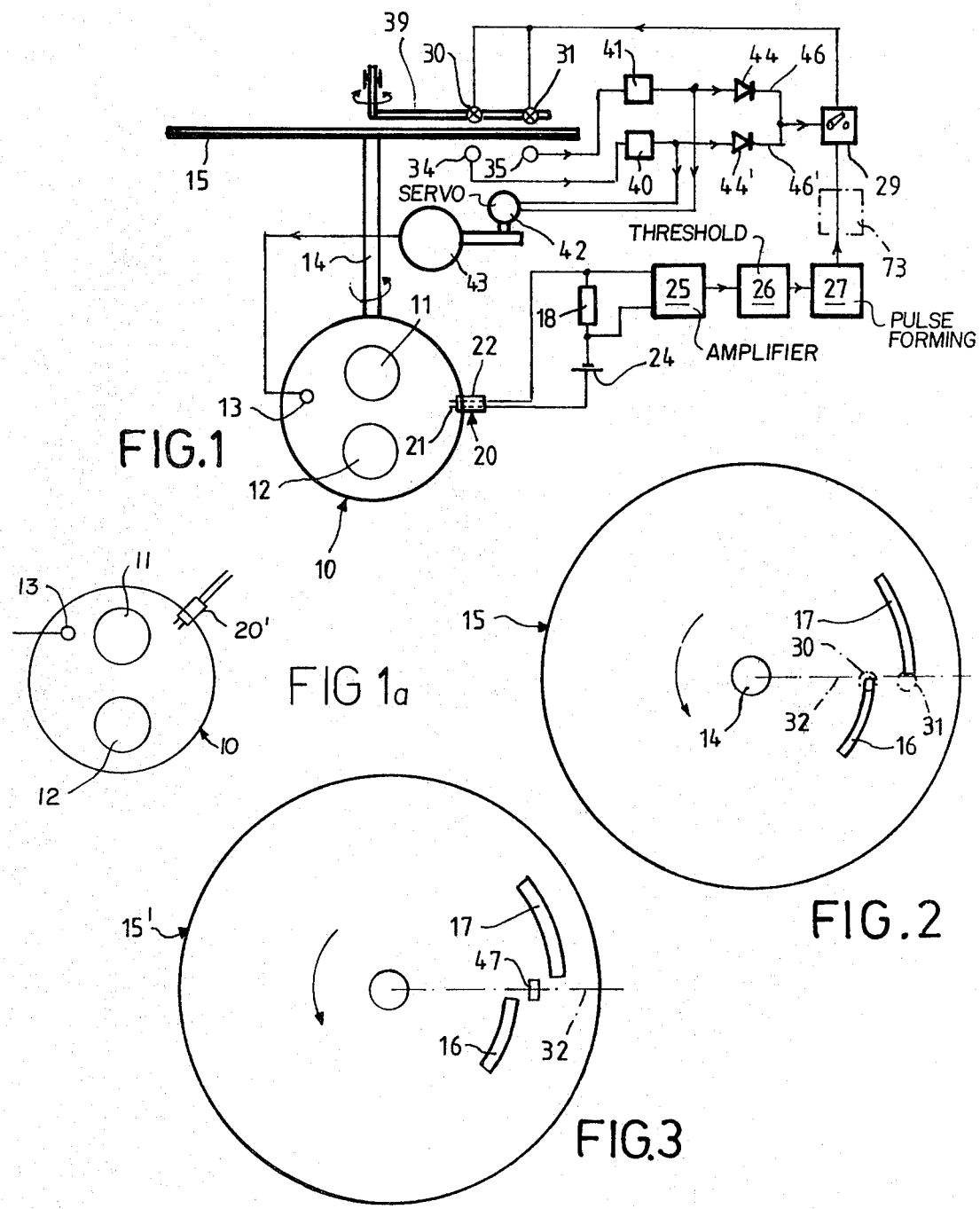

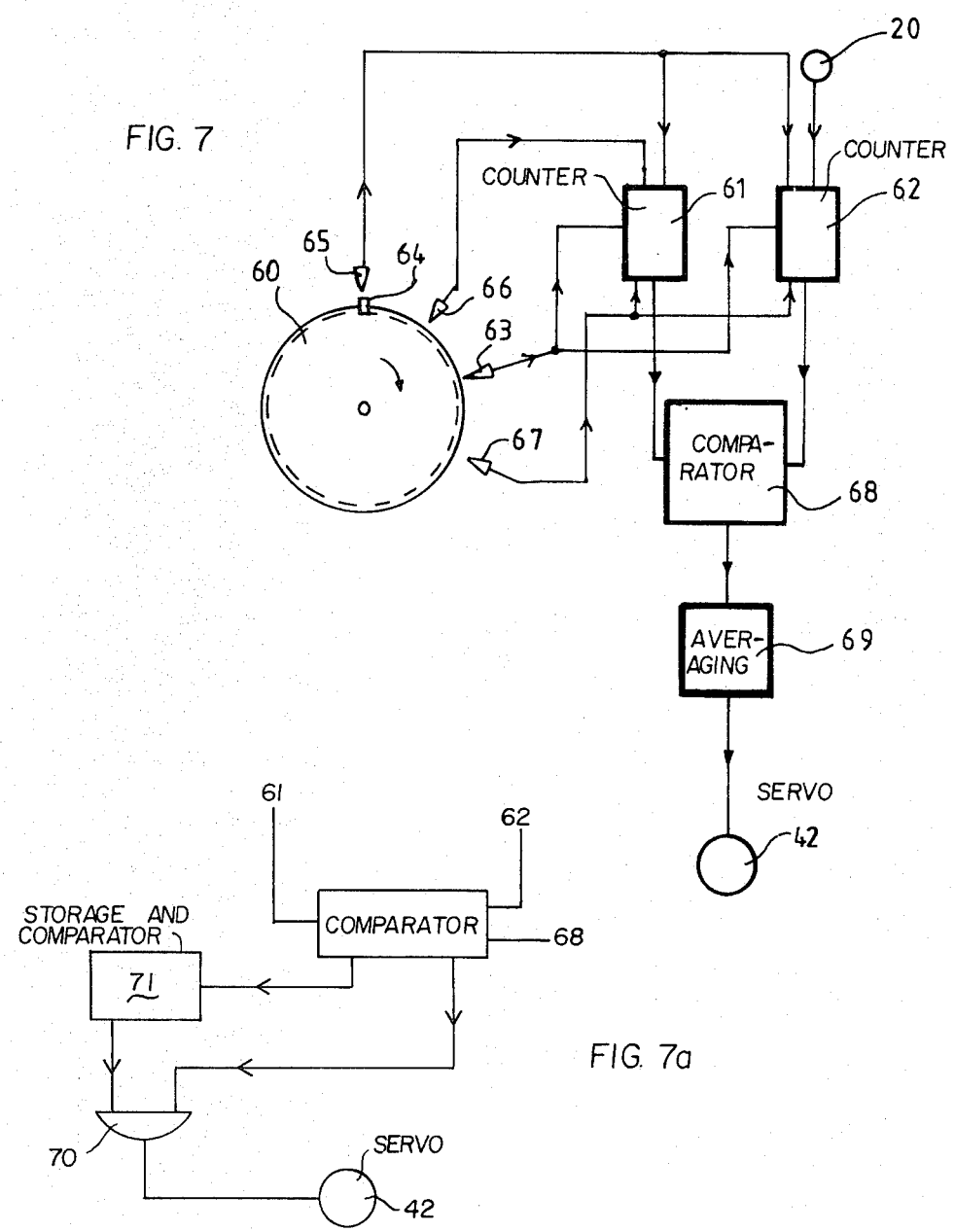

METHOD AND APPARATUS FOR CONTROLLING THE COMBUSTION PROCESS OF AN INTERNAL COMBUSTION ENGINE

BACKGROUND OF THE INVENTION

The invention concerns a method and apparatus for controlling the operation of an internal combustion engine, and in particular, to a method and apparatus for controlling the combustion process of an externally ignited internal combustion engine.

Different procedures exist to influence the combustion process of externally ignited combustion engines containing at least one combustion chamber with at least one reciprocating or rotating piston. It is an established fact that ignition settings and/or the composition of the combustion charge, i.e., air-fuel ratio of the charge, may be altered in accordance with selected operating parameters, such as, for instance, engines revolutions, outside temperature, barometric pressure, temperature of the cooling water, temperature of the lubricating oil, temperature of the fresh charge and the oxygen content of the exhaust gas. It is also an established fact that knock or detonation sensors can be installed in an internal combustion engine which detect detonation and accordingly alter the ignition setting to elminate the detonation. The aquisition of these parameters and the necessary procedures to alter the ignition setting and/or the composition of the combustion charge do not necessarily guarantee the maintenance of the initial thermal efficiency during long time operation. Rather, on the contrary, due to uncontrolled foreign influences, the initial ignition setting is altered unfavorably during operation. In addition to this situation, if many parameters are sensed and utilized to obtain the ignition setting, the tuning of these parameters to each other can be complicated and time consuming. Furthermore, the existing methods which independently alter the ignition settings cannot take into account all the parameters which really influence the combustion process, i.e., the composition of the actual fuel, the deposits accumulated in the combustion chamber after a certain period of time, the inside temperature of the combustion chamber, and the instantaneous setting of the carburator, etc.

OBJECTS AND SUMMARY OF THE INVENTION

It is therefore an object of the present invention to provide a method and apparatus for regulating the combustion process of an internal combustion engine, which will enable high thermal efficiency to be obtained in the engine, without having to sense and process a large number of such parameters and which is able to take into account uncontrolled external influences at the determination of the ignition setting.

A further object of the invention is to provide a method and apparatus for governing the optimal ignition timing of extremely diluted and/or lean combustible mixtures of air, fuel, and exhaust gas in an internal combustion engine.

Another object of the same invention is to provide a method and apparatus for the anticipated sensing of imminent knock and consequent regulation of the engine combustion process to prevent such undesired knock.

A still further object of the invention is to realize in one arrangement all the above mentioned objects in a cost-efficient manner.

The invention described herein is used to control the combustion process of an internal combustion engine which includes at least one cylinder having a closed top end and a piston which is translatable within the cylinder between top and bottom positions and which defines, with the closed end of the cylinder, a combustion chamber. During each combustion cycle, a combustion charge, i.e., a combustible gaseous mixture including fuel and air, within the combustion chamber, is progressively ignited, starting at a predetermined ignition initiation location in the combustion chamber, with the flame front expanding outward from the ignition initiation location throughout the cylinder. For example, one or more spark plugs may be used to initiate ignition of the charge at ignition initiation location in the combustion chamber.

The invention includes a flame front detector disposed in the combustion chamber at a location F which is spaced from the ignition location to assume that most of the charge will have been ignited by the time the flame front reaches this sensor, at which time the piston is being moved toward its bottom position by the expanding charge. The invention also includes a piston sensor for indicating at least the direction of deviation of the instantaneous piston position, at the moment the flame front sensor, relative to a selected piston position K which defines a K-track defined by the piston from its top position to the K position.

With the method and apparatus described herein, it is possible to obtain the most efficient ignition setting, producing optimum, or virtually optimum running conditions of an internal combustion engine, without having to sense and process a large number of parameters influencing the combustion process and the thermal efficiency necessary to produce the required ignition setting. It is sufficient to sense the arrival of the flame front at the predetermined F-location in the combustion chamber and to adjust the K-F coincidence with the arrival of the piston at the end of the K-track. With automatic ignition adjustment in this manner, uncontrolled foreign influences capable of altering the ignition setting can be taken to consideration.

The method provides therefore a virtually variable alteration of the ignition setting in such a manner that, the approximate K-F coincidence exists. In this manner, all parameters of the internal combustion and the charge on which the combustion process is dependent, are taken into consideration, including parameters such as the composition of the fuel, the composition of the combustion air, the temperature of the combustion chamber, the influence of the combustion process due to deposits of residues in the combustion chamber and the like. This inventive method may also sense operating conditions indicating the danger of detonation before such detonation occurs, so that detonation or the risk of detonation from the beginning can be counteracted sooner than by the conventional methods known to this day, in such a manner that, if the risk of detonation actually occurs, it can be considerably reduced or even quickly counteracted. Preferably it can be provided for this purpose, that the arrival of the flame front of the flame caused by the spark plug is sensed in an area of the combustion chamber, in which the danger of knock causing self-ignition of the charge is particularly strong or strongest, and, if self ignition occurs, such self ignition occurs before the arrival of the flame front of the flame caused by said spark plug, so that in the occurrence of self-ignition, the flame front sensor placed at the F-location can respond before the arrival of the flame front of the flame caused by the spark plug and by such, generate a shift of the ignition timing point (ITP) which counteracts the risk of detonation during subsequent combustion cycles. It is of particular advantage, if the center (hearth) of self ignition is located, as close as possible to the flame front sensor, so that the flame front sensor (FFS) always detects the knock before the arrival of the flame front of the flame caused by the spark plug.

To further assure reliable detection of knock, the flame front sensor is heated up to higher operating temperatures by the charge combustion than are the adjacent wall areas of the combustion chamber, so that this flame front sensor increases slightly the risk of self ignition of the charge and thereby can contribute to initiation of self ignition. Thereby it is also achievable, if the internal combustion engine comprises several cylinders whereby only one cylinder is equipped with the flame front sensor, that the self ignition of the charge starts primarily in this particular cylinder, the other cylinders therefore not requiring flame front sensors. In this case the flame front sensor is acting as a pre-knock sensor for the other cylinders.

The internal combustion engine can consist of one or several cylinders, having one or several combustion chambers. If such an engine consists of several cylinders, it is normally sufficient to sense the arrival of the flame front at the F-location and to adjust the K-F coincidence in one combustion chamber only. The influencing variables on which the combustion process is dependent, have virtually identical values in each combustion chamber of an internal combustion engine and small differences between combustion chambers can be neglected. It is nevertheless also possible, in case that each cylinder of an internal combustion engine processes its own ignition system, independent of the other cylinders, to install a flame front sensor in each combustion chamber and to alter the ignition setting in each cylinder independently, according to the inventive system. Or, it is possible to separately check the K-F coincidence of each cylinder or of several groups of cylinders of an internal combustion engine, calculate the average value of the differences and utilize this value to alter the ignition setting of all the cylinders or of one or several groups of cylinders. Preferably, it may be provided for, that the K-F coincidence be exclusively adjusted by altering the ignition setting only and that no other parameters assist hereby.

In many cases, it can also be favorable to enable even more improvements to be obtained, or to improve certain operating conditions, to regulate the K-F coincidence in at least one operating range and or upon the occurrence of certain operating conditions or situations, by altering, one or in combination, the composition of the charge, meaning that, then, not only the ignition setting is a regulating variable for the control of the K-F coincidence, but that as an additional correction variable, the modification of the composition of the combustion charge is utilized. This step can be provided for in the whole range of adjustment of the ignition setting, in only one or more selected adjustment ranges, or at one or both limits of the ignition setting adjustment range. For instance, it can be provided for that, in one predetermined ignition adjustment range only the ignition setting be altered to adjust the K-F coincidence, whereas in an adjustment range or ranges bordering one or both extremities of this ignition adjustment range, in addition to, or instead of, altering the ignition setting to adjust the K-F coincidence, the composition of the charge is modified to alter the speed of combustion of the charge in the combustion chamber, for example, by enrichening and or by leaning off the fuel in the air mixture, or by the controlled addition of exhaust gas to the fresh charge. (exhaust gas recirculation). The combustion speed of the charge is generally lower, the leaner the mixture is and is achieved either by increasing the portion of the air and or by adding exhaust gas to the fresh charge.

The invention allows the adjustment of the ignition setting of an operating internal combustion engine, exclusively by altering the K-F coincidence, so that existing ignition distributors or other established systems to alter the ignition setting become unnecessary, whereby for the starting of the engine a favorable ignition timing point can be, if required, automatically adjusted. It is nevertheless also possible to continue utilizing existing distributors or other established sytems to obtain a rough setting of the ignition and to supplement this rough setting with a fine setting for regulating the K-F coincidence.

It is often favorable to forsee that the regulation of the K-F coincidence is only realized in at least one operating range of the combustion engine and in the other operating ranges the regulation is put out of function, the ignition timing point of the charge in this or these other operating conditions being determined then only by a predetermined ignition timing gap. Thereby it is possible to provide in this or these operating ranges, in which the K-F coincidence is regulated the above-mentioned rough setting of the ignition timing point according to an ignition timing point map which is adjustable, or in several cases also constant—or, in certain cases, to provide in at least one operating range the ignition timing point adjustment only by regulation of the K-F coincidence. The rough adjustment of the ignition timing point according to a predetermined ignition timing point may nevertheless have the advantage that the fine regulation of the K-F coincidence is performed more rapidly.

For particular advantage it can be foreseen, that at least in the idle range and the overrunning range of the internal combustion engine, and preferably also in a low part load range adjacent to the idle range, the K-F coincidence regulation is put out of function. It is also often particularly preferable to provide that the regulation of the K-F coincidence is put out of function at mean effective working pressures of the internal combustion engine, which are lower than approximately 1.5 bar.

In many cases, it is sufficient if the length of the K-tract, at least in the complete load range of an internal combstion engine stays constant, which means, not adjusted in the load range. This constant value of the K-tract can be also considered of value for the idling range. It is then sufficient to establish this constant for a particular engine directly by the engine constructor. It is also possible, to incorporate provisions for manual adjustment of the K-track, to permit, for instance a repair workshop to adjust the length of this K-track. As the crank angle (rotational angle of the crankshaft) and also the rotational angle of the crankshaft is functionally related to the position of the piston, the K-track can also be indicated in crank or camshaft degrees. Other possibilities exist as well. One could therefore also determine when the piston has arrived at the end of the K-track by means of indicating engine crank—or camshaft angles, or by indicating the angle of any other crank driven component of the engine, so that such measurements need not be made directly on the piston. It is of particular advantage, if the K-track corresponds to relatively large crank angles. Preferably it can be foreseen, that the end of the K-track corresponds, at least at full load, to a crank angle of at least 15°, preferably at least 18°, after the top dead center position of the piston.

In many cases it may also be useful to provide an automatic adjustment of the length of the K-track, dependent on at least one parameter of the engine and/or on the charge, preferably dependent on the engine revolutions and or on the position of the power control system, i.e., the carburator throttle valve—or fuel injection control rod position. It can, in many cases, therefore be useful to forsee, to facilitate the starting of an internal combustion engine, that for starting, the K-track length is set to another length than after successful start, so that therefore, in this case two different constant K-lengths are utilized (for the start and for the normal running operation). Or one can provide for the idle range a different length of the K-track than for the load range. It is also possible to provide for the possibility of automatic adjusting of the length of the K-track, continuously or in steps, dependent on at least one parameter of the internal combustion engine, and/or on the charge, preferably dependent on the engine revolutions, and/or on the load, and/or on the selected transmission ratio of the gearbox driven by the crankshaft be used. Also other parameters are conceivable.

The adjustment of the length of the K-track (one could speak of the adjustment of the value of the K-track, or even simpler of the adjustment of the K-track) can in many cases be advantageously be utilized to reduce the emissions in one or several operating ranges of the internal combustion engine, where the exhaust gases contain a large pollutant emission, i.e., by retarding the ignition setting more than the setting where it would produce the optimum thermal efficiency for the engine. This is the case, in general, at one or several narrow operation ranges, i.e., in the idling range and/or in a low part load range. In this or these other operating ranges of the internal combustion engine, one can set the K-track to the requirements of possibly the optimum thermal efficiency of the engine.

The invention permits high thermal efficiencies to be obtained and allows for high running safety as the ignition setting can no longer be disturbed by uncontrollable foreign effects, and represent a cost efficient solution. Optimum adaption of the system to desired operating conditions can be obtained. The engine can also be operated with very lean fuel—air mixtures, respectively with a fuel-air mixture heavily diluted with exhaust gases, which increases the burning efficiency of the charge.

The arrival of the flame front at the F-location can be sensed in different manners. In a preferred embodiment, the arrival is sensed electrically by a sensor, which produce an ion current as the flame front reaches this sensor. Ideally, the flame front sensor will consist of two metallic electrodes connected across an electric voltage source. When the flame front reaches these electrodes, the gap between these electrodes becomes ionnized, resp. ions cross this electrode path and, due to the voltage between the electrodes, an ion current can be measured. Also other methods of sensing the arrival of the flame front are conceivable, i.e., by means of a temperature sensor, which responds nearly without inertia to temperature variations. It can be imagined, that such a temperature flame front sensor can be a temperature-dependent resistance or simply a thermo couple with virtually no inertia.

The invention can be applied in several cases only to control the ignition timing in an anti-knock manner, provision being made that the flame front sensor produces only a displacement of the ignition timing point and/or a change in the composition of the charge, if it senses the arrival of the flame front before reaching a predetermined first crankangle, which is smaller than the second crankangles at which the flame front of the flame ignited by the spark plug reaches the flame front sensor, whereby the ignition timing point variation, generated by the flame front sensor, shifts the ignition point towards "later" and whereby under normal conditions the ignition timing point adjustment is done accordingly to a predetermined ignition timing point. The first crankangle can, for instance, be 10° after top dead center of the piston and the flame front sensor is then so positioned, that the flame front of the flame generated by the spark plug reaches the flame front sensor only at greater crank angles, for example 15° or more, after top dead center of the piston.

This method of anti-knock control is, for instance, possible in such a manner, that the electric signal indicating the arrival of the flame front at the flame front sensor must pass an AND-gate, which, at each reaching of the first crankangle, is blocked during a larger crankangle, for example 300°, and then is opened again up to the next arrival of the first crankangle, so that only signals caused by self ignited portions of the charge can initiate adjustment of the spark timing, and only towards "later". As long as no trace knock occurs, the ignition timing is adjusted in conventional manner following an ignition timing point map and to this conventional adjustment, as long as the flame front detector senses knock causing self ignition, a shift of the ignition timing point towards "later" is overlayed. This said overlaying is cancelled as knock conditions disappear.

The flame front sensor, which senses the arrival of the flame front in the combustion chamber at the F-location can preferably by positioned in the area of the combustion chamber which prevails in the top dead center position of the piston. When greater distances between the flame front sensor and the spark plug are desired or required, a recess in which the flame front sensor is positioned can be forseen in the piston sliding surface. (cylinder wall). Generally, it is especially useful to install the flame front sensor in such a manner, that the flame front only reaches it when at least 70% of the charge is already burnt, preferably when 70-90% of the charge is already burnt. It should preferably be provided for that, the F-track be greater than ½ the diameter of the piston sliding surface.

Often, it is of advantage to provide that the arrival of the flame front at the F-location takes place only towards the end of the combustion process.

The invention will be better understood and further objects and advantages thereof will become more apparent from the ensuing detailed description of the preferred embodiments taken in conjunction with the drawings.

BRIEF DESCRIPTION OF THE DRAWINGS

FIG. 1 shows, in schematic presentation, a bottom view of an area of a cylinder head bordering the upper part of a combustion chamber of an externally ignited combustion engine, as well as a schematic diagram of a circuit for regulating the K-F coincidence.

FIG. 1a shows an alternative arrangement of the flame-front sensor shown in FIG. 1.

FIG. 2 shows a top view of the slotted disc of FIG. 1 connected to the camshaft.

FIG. 3 shows a variation of the slotted disc.

FIG. 7 is a block diagram of another embodiment of a K-F coincidence regulating device.

FIG. 7a shows an alternative circuit arrangement to FIG. 7.

DESCRIPTION OF PREFERRED EMBODIMENTS

Figure 5:
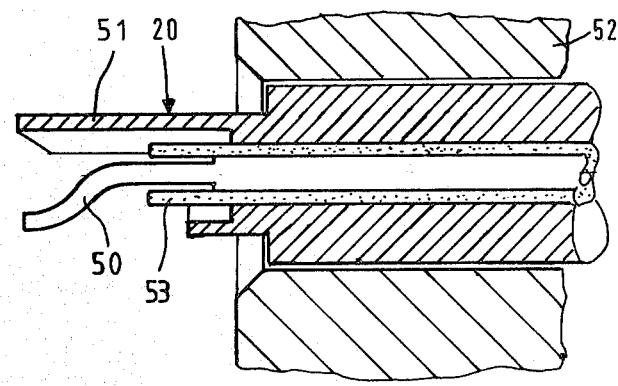
FIG. 5 is an enlarged view of a portion of FIG. 4.

FIG. 1 shows a cylinder head 10 of a cylinder having a piston (not shown) which is slidably disposed within the cylinder and defines, with the cylinder head 10, the cylinder combustion chamber.

The cylinder head 10, includes an inlet valve 11, an exhaust valve 12 and a spark plug 13. The engine crankshaft (also not shown) related to this piston drives a camshaft 14 which actuates valves 11 and 12. A slotted disc 15 is securely fixed onto the camshaft 14. The disc 15 includes circular arcate slots 16 and 17, concentric to the rotational axis of the slotted disc, but at different radial distances.

A short end portion of a flame front sensor 20, arranged in the cylinder head wall, protrudes a short distance into the combustion chamber in a position approximately diametrically opposite the spark plug 13 representing the F-location and contains two closely spaced free ending separate metal electrodes 21, which determine the F-location and are insulted from each other by a ceramic insulator 22 screwed into the cylinder head. This flame front sensor 20 is located near the inlet valve and connected via a resistor 18 to a constant voltage source 24. The resistor 18 is connected to an amplifier 25. The output of the amplifier 25 is connected via a threshold stage 26 to an impulse forming stage 27. Only when the current flowing through the resistor 18 exceeds a predetermined value, will the threshold stage 26 permit the output signal of the amplifier 25 to flow towards the impulse forming stage 27. The impulse forming stage 27 produces an impulse of constant level after each command of the step value stage 26, actuating a switch 29 to commonly turn on and off a first and a second light source 30 and 31, which could be a light-emitting diode, for instance.

The light sources 30, 31 are disposed on one side of the disc 15 and two photo sensitive sensors 34, 35 are disposed on the opposite side of the disc 15 so that the light source 30 can illuminate the photo sensitive sensor 34 through the slot 16, and the light source 31 can illuminate the photo sensitive sensor 35 through the slot 17. The slot 16 ends approximately at a geometrical radius line 32 of the disc 15, at which point slot 17 begins in relation to the direction of rotation of disc 15.

The photo sensitive sensors 34 and 35 are connected via signal amplifier and forming stages 40 and 41, respectively, to a servomotor 42, for example, a pneumatic or electric servomotor, which is capable of incrementally adjusting a spark distributor 43 for determining the spark timing and delivering ignition voltage to the spark plug 13.

The servomotor 42 can alter the ignition setting of the distributor 43 incrementally in small steps, whereby if the sensor 34 is energized, the ignition timing point (ITP) is advanced by a small step, whereas each time when the sensor 35 is energized, the ITP of the ignition distributor 43 is shifted by a small step towards "later", by the servomotor 42. At each signal revolution of the slotted disc 15, corresponding to an operating cycle of this cylinder, such as adjustment of the ignition timing point of the ignition distributor 43 takes place by a predetermined small step, which can correspond to a crank angle (crankshaft rotational angle) of 1 to 2 degrees.

In this particular example, the ITP of the spark distributor 43 can already be roughly adjusted to the instantaneous engine speed of the combustion engine by a centrifugal advance mechanism, in which case the servomotor 42 overlays to this centrifugal adjustment a fine adjustment of the ITP to regulate the K-F coincidence.

The distributor 43 can supply all cylinders of the internal combustion engine with spark impulses in a known manner. But only the K-F coincidence of one single cylider which comprises the shown cylinder head 10, is directly regulated. If further cylinders are existing, said cylinders do not require flame front sensors 20, as their ignition adjustments are accordingly controlled by said distributor 43.

The device shown in FIG. 1, regulates the K-F coincidence in such a way that the ITP of the spark plug 13 is continuously altered via the distributor 43 by the servomotor 42, in such a way that the flame front of the burning charge in the combustion chamber always reaches the flame front sensor 20 approximately when the radius line 32 of the slotted disc 15, passes by the two light sources 30, 31, indicated as dotted lines in FIG. 2. These two light sources 30, 31 are positioned in such a manner, that the passage of the radius line 32 by these two light sources 30, 31, takes place when the piston of the cylinder comprising cylinder head 10, has moved, during the combustion cycle, a predetermined distance (K-track) from its TDC. The ending point K of the K-track can correspond for instance to a crankangle of 18° (related to the top dead center of the piston).

Naturally, this is only an example and one has to take various factors into consideration which will alter the K-track, such as the layout of the combustion chamber, the position of the flame front sensor and other influencing variables.

To enable the K-track to be adjusted, both light sources 30, 31 are mounted on a support 39, swingable round a swing axis, which is coaxial to the rotation axis of the disc 15, which swing position is adjustable by hand or automatically in accordance with at least one parameter of the combustion engine and/or the charge, preferably in accordance with its power control device (e.g., throttle plate position), the manifold pressure, the mean effective pressure, the engine speed or the like.

When the flame front of the burning charge in the combustion chamber arrives at the electrode gap of the flame front sensor 20, the voltage at electrodes 21 produces an ion current of such a value that the amplifier 25 produces an output signal greater than the threshold (minimum perceptible difference) of the threshold value stage, which is then transformed into an impulse by the impulse transformer 27 actuating the electrical, preferably electronic, switch 29, which switches on light sources 30, 31. If at this moment the piston has not yet arrived at the end of the K-track, the slot 17 is still under light source 31, which therefore energize the coordinated sensor 35, thereby a step towards "later" is generated via amplifier 41 and servomotor 42, shifting the ignition timing point of the distributor 43 by one step towards "later". In this particular case the flame front arrived at the flame front sensor too early, so that for regulating the K-F coincidence a small shift of the ITP towards "later" is done.

The output signal of amplifier 41 which is also supplied to the switch 29 via a rectifier diode 44 and conductor 46 switches off switch 29 so that light source 30, 31 are switched off, thus preventing any further adjustments of the distributor 43.

If during the following operating cycle the same event is repeated, the ITP of distributor 43 is shifted towards "later" by a further step. If, to the contrary, the flame front arrives at the flame front sensor 20, only after slot 16 has arrived under light source 30, then the switching on of the light sources 30, 31, generated by the flame front sensor 20, illuminates only sensor 34 by the light source 30. The sensor 34 then, via amplifier 40 and servomotor 42, triggers a shift of ITP of the distributor 43 by one step towards "earlier". Also the impulse produced by amplifier 40, via the conductor 46' having the diode 44', causes switching off of switch 29 and thereby turns off the light sources 30, 31 in this working cycle.

This "K-F coincidence regulator" therefore causes, at each working cycle of the corresponding cylinder, an adjustment of the ITP of the spark distributor 43 by a predetermined small step towards "earlier" or "later".

The above-identified K-F coincidence regulator does not include a slack area (dead zone), that is, a small area around the exact K-F coincidence, in which no adjustment of the ITP takes place, if in this area switching on of the switch 29 is triggered. This can be provided, for example, by providing a third slot or hole (perforation) in the slotted disc 15 and coordinating to this a third light source and a third photo sensitive detector, which third detector, upon being illuminated, triggers switching off of switch 29 without an associated shift of distributor 43.

Such a disc 15' is shown in FIG. 3. Through the third hole 47 the radius lie 32 passes centrically and the two slots 16, 17 are positioned circumferentially at an angle from one another in the disc 15' in such a manner as to be located offset to the light sources 30, 31 if the third light source triggers the corresponding third photo sensitive detector through hole 47. Therefore, if at the time of the flame front arrival at the flame front detector 20, the hole 47 is positioned adjacent the third light source, switch 29 is immediately switched off, without the servomotor 42 having been triggered. At this operating cycle therefore no shift of the distributor takes place by the flame front sensor 20. However, a shift of the ITP will occur if, upon switch on of switch 29, the light source 30 or 31 excites the sensor 34 or 35, respectively. The aforementioned term "operating cycle" represents either the four strokes of a four stroke engine or the two strokes of a two stroke engine required for the charge to be changed and the combustion to be performed in the cylinder.

The distributor 43 can, for example, correspond to a distributor as represented on page 734 of the *Taschenbuch für den Kraftfahrzeugingenieur* ("Pocket book for the Passenger Car Engineer"), written by Buschmann and Koessler, 7th Edition, Deutsche Verlagsanstalt, Stuttgart, with the difference, that its distributor housing is not fixed but arranged rotationally around the longitudinal drive axis and is rotatable by means of the servomotor 42 so to regulate the K-F coincidence, so that the predetermined ITP map comprising the parameters of engine speed and manifold pressure controls the rough (coarse) setting and the K-F coincidence regulator controls the fine setting of the ITP of this distributor, according to FIG. 1.

With modern electronic timing devices, for instance, digital ignition timing devices, the fine control (adjustment) for the K-F coincidence regulation of the ITP is also applicable without problems, for example, by phase shifting of the signal triggering the ignition coil.

Figure 4:
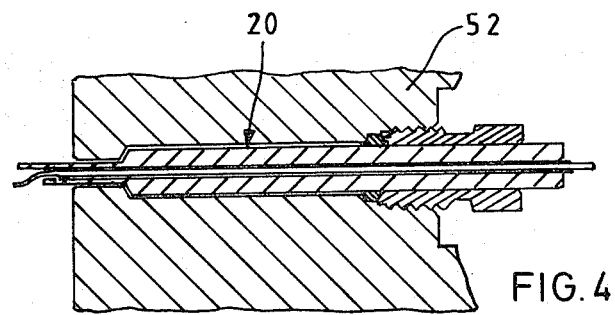
FIG. 4 is a cross-sectional view of a flame front detector, according to the invention.

In FIGS. 4 and 5 an example of a flame front sensor 20 and its arrangement in the surrounding wall area 52 of the corresponding combustion chamber is shown in longitudinal section. The sensor 20 serves to sense an ion current generated by the arriving flame front in combination with a DC voltage applied to the metal electrodes 50, 51. The central electrode 50 is connected to the DC voltage and the electrode 51 is grounded. Electrode 50 is electrically insulated by an insulating pipe 53 from electrode 51. Both electrodes 50, 51 protrude some millimeters out of the wall 52 into the combustion chamber, so that these electrodes reach relatively high operating temperatures, which somewhat increase the danger of self ignition of the charge, so that the self ignition of the charge, causing knock, can be initiated, by one or both of the electrodes 50, 51. Therefore, in the case of each such self ignition, the induced ion current of sensor 20 appears earlier than it would by being triggered by the arrival of the flame front of the flame ignited by the spark plug 13. Consequently, upon the occurrence of self ignition or knocking, the K-F coincidence regulator shown in FIG. 1 receives a signal from the flame front sensor indicating early ignition, and therefore automatically shifts, by means of servomotor 42, the ITP of the distributor 43 towards "later", so that the ITP is very rapidly shifted towards "later" until this knocking ceases. Afterwards, the ITP is automatically again advanced by the K-F coincidence regulator and if again knock begins, then again automatic retard' of the ITP is realized until the combustion engine again reached operating conditions where the danger of knock does not prevail. Then normal governing of the K-F coincidence takes place until the appearance of an abnormal condition where again danger of knock is present.

Figure 6:
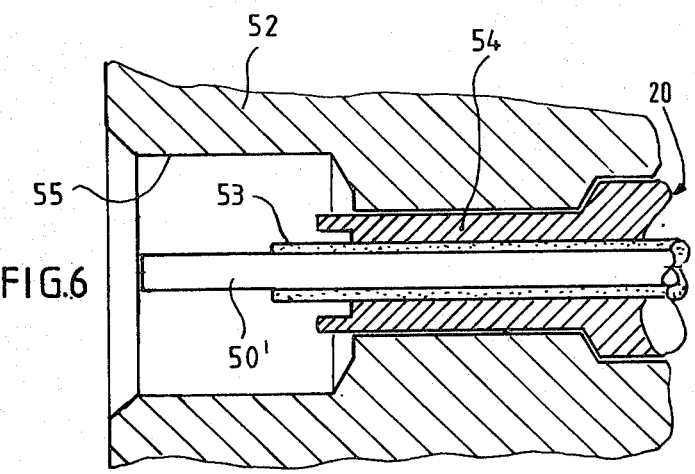
FIG. 6 is a partial, cross-sectional view of another embodiment of the flame front detector.

The flame front sensor 20, shown in FIG. 6, includes a metallic center electrode 50' shaped as a straight pin, which is electrically insulated by an insulating pipe 53 from the casing 54 of the flame front sensor 20 arranged in the wall 52. The electrode 50' is located in a rotationally symmetric recess 55 of approximately 3 to 5 mm diameter of the wall 52, the mass electrode being in this case the wall 52 itself.

In the examples of flame front sensors according to FIGS. 4–6, a free end section of the insulating pipe 53 protrudes into the combustion chamber so that this free end section of said insulating pipe 53 can reach selfcleaning temperatures. A value of approximately 12 volts is then generally sufficient for the electrode voltage. Also these flame front sensors 20 are developed in such a manner that the operating temperatures of their electrodes 50, 51, 50', respectively, are so high that they can induce self ignition of the charge whenever it is likely that knock will occur. Preferably it can be provided that the temperature of at least one electrode 50, 51, 50', respectively, reaches values from approximately 400° to 800° C. under full load operation of the internal combustion engine, preferably approximately 600° to 700° C.

The double bend of the central electrode 50 of the flame front sensor 20 represented in FIG. 5 increases the distance between the ends of the electrodes 50 and 51 to facilitate the access of the flame into the ion gap formed by the two electrodes 50, 51. The length of the ion gap may be for example 0.6 to 1.0 mm.

An electronic K-F coincidence governor is shown in FIG. 7. It cooperates with a rotatable ring gear 60 which is operatively connected to the crankshaft whereby the ring gear 60 is rotated about its axis by the crankshaft so that each revolution of the ring gear 60 corresponds to one combustion cycle of an engine cylinder. A first sensor 63, for example an inductive sensor, is disposed adjacent the circumference of the ring gear 60 so that the passage of each single tooth of the ring gear 60, past the first sensor 63 causes it to trigger one counting impulse, which impulses can be counted in each of two counters 61, 62 in a parallel manner. A metallic pin 64, which is attached to the ring gear 60, cooperates with the further sensors 65, 66, 67 so as to induce, at each passage of the pin 64 in front of the sensors 65–67, a short trigger impulse from these sensors. Sensor 65 is located so that it is excited by the pin 64 and emits a brief pulse always at the moment when the piston of the combustion chamber containing the flame front sensor 20 reaches its top dead center position at the end of its compression stroke. The sensor 65 then starts the parallel counting of the counting impulses generated by sensor 63 by the counters 61, 62. When pin 64 passes sensor 66, sensor 66 emits an impulse which causes the counter 61 to cease counting immediately. The then prevailing content of the counter 61 is a measure for the length of the K-track, that is, the crank angle through which the crankshaft has travelled from the time of reaching the top dead center position of the piston to the end of the counting operation of the counter during the respective combustion cycle. Thus, the angular position of sensor 66 relative to the ring gear 60 describes the length of the K-track, and the length of the K-track is adjustable by shifting the sensor 66. The counting of the counting impulses delivered by sensor 63 to the second counter 62 is terminated at the corresponding combustion cycle by the signal generated by the flame arriving at the flame front sensor 20. The fourth sensor 67 produces a signal upon passage of pin 64 after the termination of counting by the counters 61, 62, which signal triggers the transfer of the counting content of the two counters 61, 62 to a comparator 68 and the two counters 61, 62 are then reset to zero. Thus, at each operating cycle of the combustion engine, the comparator 68 determines the difference of the two counting contents fed into it according to algebraic signal and absolute value and transfers this difference value to an average forming stage 69, which can be, for example a ring counter. The average forming state 69 accumulates and averages the content of a predetermined number of difference values, delivered by comparator 68, according to algebraic sign and absolute value, for example, the average value of the difference values measured consecutively during the last three combustion cycles of the respective cylinder. The measurements delivered by comparator 68 can also eventually be accumulated in the average stage 69 such that they fade with time. The output of the averaging stage 69 is directly a measure for the algebraic signal and dimension of the deviation of the arrival of the flame front at the flame front sensor 20 to the K-F coincidence and is fed directly, or after appropriate further processing, to the servomotor 42 to adjust the ignition timing point to govern the K-F coincidence. Since the output signal delivered from the average former 69 is dependent on the magnitude of the deviation of the K-F coincidence, the ignition timing point of the charge will be adjusted at each time by an increasing value as the average value of several consecutive deviations from the K-F coincidence is increasing. Hereby the task of the average value forming device 69 is to average purely random deviations of the arrival of the flame front at the flame front sensor 20, so to increase the accuracy of the K-F coincidence regulation if, under constant operating conditions, random deviations of the arrival of the flame front at the flame front sensor could appear. If one deletes the average value former 69 from FIG. 7, which also is conceivable, then the ignition timing point can upon every adjustment be shifted by a bigger value, the bigger the deviation of the arrival of the flame front at the flame front sensor 20 to the K-F coincidence is. Such random deviations of the arrival of the flame front at the flame front sensor at constant operation conditions may especially appear when there is an unfavorable design of the combustion chamber.

To reduce the influence of such hazardous deviations, other methods can also be foreseen additionally or alone. In many cases it can be preferably provided that an adjustment of the ignition timing point is only realized, if the detected deviation of the arrival of the flame front at the flame front sensor to the K-F coincidence does not change its algebraic sign during a predetermined number of consecutive measurements of the arrival of the flame front at the F-location, for example, during two consecutive measurements. This can be realized, for example, by the following modification of the regulating device shown in FIG. 7. Instead of the average forming stage 69, an AND gate 70 is inserted as shown in FIG. 7a and to the comparator 68 an algebraic sign storage and comparator component 71 is connected, in which the algebraic signs of the last m difference values formed by the comparator 68 are stored and compared, and which opens the AND gate 70 opens only if the stored algebraic signs 71 are same, whereby m may be, for example, 2 or 3. As long as the stored algebraic signs in the component 71 are not identical, no adjustment of the ignition timing point is done by the K-F coincidence regulating device.

It can also be provided that the average value former 69 is retained and the AND gate 70 is connected to the output of 69 so that the AND gate 70 prohibits or permits the output of the average value by the component 71.

Instead of adjusting the length of the K-track by adjusting the sensor 66 (FIG. 7) or by turning the disc 39 (FIG. 1), it can be provided that the K-track length is adjusted in that the adjusting components contain a time delaying component which delays the arrival of the signal indicating the arrival of the flame front at the flame front sensor. Such a time delay component 73 is shown by dash-dotted lines in FIG. 1. Its time delay is, for example, Dt/n, where Dt is a steady or incrementally variable time span, adjustable by hand or automatically in dependence on at least one operating parameter of the combustion engine, n representing the engine speed. The larger Dt/n, the longer is the K-track.

To enable the flame front sensor 20 to detect knock induced by self ignition, immediately upon occurrence of beginning of knock, it can provided in a preferred embodiment, that the flame front sensor 20' is disposed far from the exhaust valve 12, near to the circumferential half of the inlet valve plate of the inlet valve 11 facing away from the exhaust valve 12.

Such a disposition of a flame front sensor 20 is shown in FIG. 1a at 20'. Hereby the flame front sensor is located in a relatively "cold" area of the combustion chamber in which normally knock occurs preferentially.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for regulating operating parameters of an internal combustion engine having at least one combustion chamber being provided with ignition means responding to one of said parameters, wherein a combustible charge is ignited by said ignition means and thereafter burns progressively to originate a moving flame-front, comprising the steps of
   sensing the flame-front arrival independently of at least one of initiation and duration of said flame-front within said combustion chamber in the end-gas zone of said progressively burning combustible charge, said end-gas zone being defined as that area of said charge which is ignited by said flame-front after a predominate part of said charge has burned,
   detecting a deviation between the value of said arrival and a set-point value independently of at least one of initiation and duration of said flame-front, and
   controlling at least one of said engine operating parameters in response to said deviation.

2. A method according to claim 1, wherein one of said engine operating parameters is an ignition timing adjustment.

3. A method according to claim 1, wherein one of said operating parameters is an exhaust gas recirculation rate.

4. A method according to claim 1, wherein one of said operating parameters is the fuel/air mixture.

5. A method according to claim 1, wherein one of said operating parameters is the composition of fuel.

6. A method according to claim 1, wherein one of said operating parameters is the composition of combustion air.

7. A method according to claim 1, wherein the step of controlling at least one of said engine operating parameters is additionally controlled in accordance with the rpm of said engine.

8. A method according to claim 1, wherein the step of controlling at least one of said engine operating parameters is additionally controlled in accordance with the crankshaft angle of said engine.

9. A method according to claim 1, wherein said predominate part of said charge comprises from 70 percent to 90 percent of said charge.

10. An apparatus for regulating operating parameters of an internal combustion engine having at least one combustion chamber being provided with ignition means responding to one of said parameters, wherein a combustible charge is ignited by said ignition means and thereafter burns progressively to originate a moving flame-front, comprising
    means for sensing the flame-front arrival independently of at least one of initiation and duration of said flame-front within said combustion chamber in the end-gas zone of said progressively burning combustible charge, said end-gas zone being defined as that area of said charge which is ignited by said flame-front after a predominate part of said charge has burned,
    means for detecting a deviation between the value of said arrival and a set-point value independently of at least one of initiation and duration of said flame-front, and
    means responsive to said deviation for controlling at least one of said operating parameters.

11. An apparatus according to claim 10, wherein said means for controlling at least one operating parameter is additionally controlled in response to a means for sensing the rpm of said engine.

12. An apparatus according to claim 10, wherein said means for controlling at least one operating parameter is additionally controlled in response to a means for sensing the crankshaft angle of said engine.

13. A method according to claim 10, wherein said predominate part of said charge comprises from 70 percent to 90 percent of said charge.

14. An apparatus according to claim 10, wherein said combustion chamber is further provided with an inlet valve means and an outlet valve means for admitting, respectively, said combustible charge and discharging the combustion gases from said combustible charge, and said sensing means being located remote from said outlet valve means and adjacent said inlet valve means.

* * * * *